United States Patent [19]

Dumas

[11] Patent Number: 5,518,050
[45] Date of Patent: May 21, 1996

[54] POURING DEVICE HAVING A BUILT-IN SELECTIVE FLOW STOPPING MECHANISM

[76] Inventor: Marc Dumas, 3227, Frontenac, Laval, Quebec, Canada, H7P 1Z8

[21] Appl. No.: 268,579

[22] Filed: Jul. 6, 1994

[51] Int. Cl.[6] ................................................ B65B 1/06
[52] U.S. Cl. .................... 141/351; 222/505; 222/517; 222/556; 222/568
[58] Field of Search ................ 141/311 R, 335, 141/351, 352, 357, 360, 362, 364, 382; 222/505, 508, 517, 556, 568

[56] References Cited

U.S. PATENT DOCUMENTS

| | | | |
|---|---|---|---|
| 612,510 | 10/1898 | Walker | 141/335 |
| 886,237 | 4/1908 | Murtha | 141/335 |
| 1,879,205 | 9/1932 | Gunn | 222/508 X |
| 2,641,376 | 6/1953 | Parziale et al. | 141/360 X |
| 2,701,078 | 2/1955 | Bowman | 141/321 |
| 3,157,322 | 11/1964 | Bernhardt | 222/517 |
| 4,832,238 | 5/1989 | Taylor | 222/568 X |
| 4,834,151 | 5/1989 | Law | 141/335 X |
| 4,930,666 | 6/1990 | Rudick | 141/362 X |
| 4,982,881 | 1/1991 | Amrein | 141/351 X |
| 5,020,702 | 6/1991 | James | 222/568 X |

*Primary Examiner*—Kevin P. Shaver

[57] ABSTRACT

A pouring device for pouring lubricating oil into the oil filler neck of a conventional engine. The pouring device is adapted to prevent unwanted spilling of oil onto the exterior surface of the engine block during the pouring operation. The pouring device has a cylindrical connecting neck portion which is adapted to be threadaly mounted over the discharge aperture of a conventional lubricating oil container. The connecting neck portion extends integrally into a spout. The spout has an inlet surface. A sealing membrane is hingely connected to the connecting neck portion, adjacent the inlet surface. The sealing membrane is adapted to pivot between a closed position wherein it prevents the lubricating oil from flowing through the inlet aperture and an open position wherein the sealing membrane allows the lubrificating oil to flow through the inlet aperture. The sealing membrane is adapted to be releasably locked in its close position by a locking lip which abuts against its peripheral edge. A biasing strip extends integrally from the sealing membrane. The biasing strip is adapted to create an initial biasing force which biases the sealing membrane against the locking lip. A trigger mechanism is attached to the biasing strip for selectively increasing the value of the initial biasing force to a level at which it will allow the sealing membrane to overcome the locking action of the locking lip on the sealing membrane and cause the sealing membrane to pivot into its open position. The trigger mechanism has a trigger lever which is adapted to abut against the exterior surface of the engine when the spout is pushed into the oil filler neck.

6 Claims, 4 Drawing Sheets

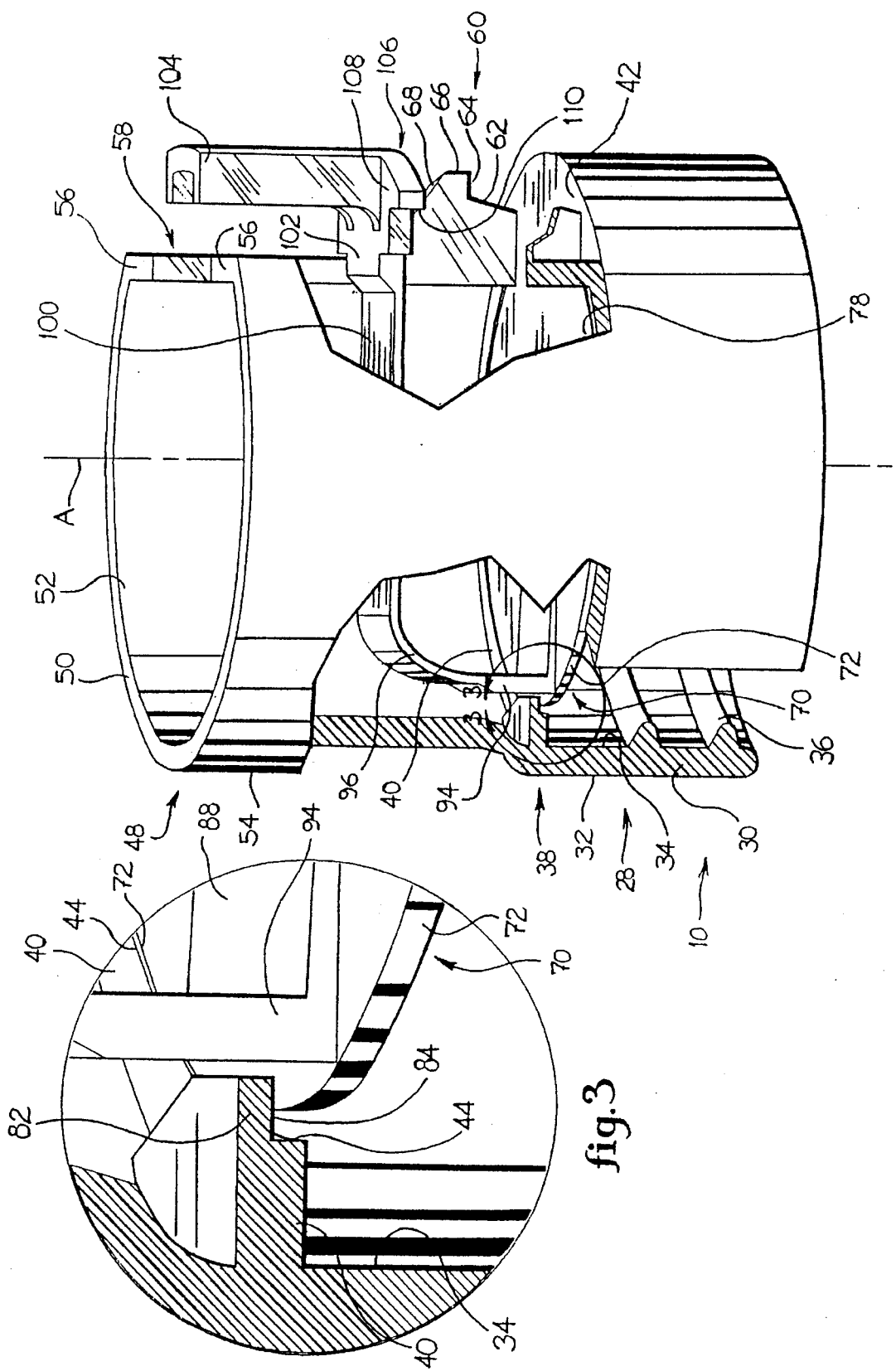

5,518,050

POURING DEVICE HAVING A BUILT-IN SELECTIVE FLOW STOPPING MECHANISM

BACKGROUND OF THE INVENTION

1. Field of the Invention

The present invention relates to the field of pouring spouts and is particularly concerned with a pouring spout adapted to be releasably and threadaly mounted on a conventional lubricating oil container. The pouring spout has a built-in selective flow stopping mechanism.

2. Prior Art

Lubricating oil is widely used in order to minimize the ware created by friction between the moving components of most conventional internal combustion engines. Since the viscosity of the oil has a tendency to break down over a given period of use, the routine maintenance of most conventional internal combustion engines such as the ones found in most conventional vehicles involves replacing the used lubricating oil. During the oil changing operation, the user must pour the oil from a container into an oil filler neck, part of the engine.

Because of the positioning of the oil filler neck and because of the specific shape of the oil container, it often happens that during the pouring operation of the oil from the container into the oil filer neck, some of the lubricating oil is spilled on the exterior surface of the engine block. The oil which is spilled on the exterior surface of the engine block not only deteriorates the aesthetically pleasing appearance of the latter, but also creates an unpleasant smell when the temperature of the engine rises during ulterior operation.

Furthermore, the presence of oil on the exterior surface of the engine block makes it more difficult to evaluate if the engine consumes or loses lubricating oil.

Accordingly, most users resort to utilizing a pouring funnel during the pouring operation in order to minimize the amount of oil which might get spilled on the exterior surface of the engine block. However, since the flow rate of the funnel is often smaller than the flow rate through the discharging aperture of the oil container, the pouring operation is slowed down. Furthermore, some oil droplets often fall onto the exterior surface of the engine block once the pouring operation is over and the funnel is pulled out of the oil filler neck.

SUMMARY OF THE INVENTION

Accordingly, an object of the present invention is to provide an improved pouring device. The pouring device in accordance with an embodiment of the present invention is adapted to be readily and releasably mounted over the discharged aperture of most conventional lubricating oil containers.

The pouring device in accordance with an embodiment of the present invention is adapted to prevent the oil contained in the conventional oil container from flowing out of the discharged aperture of the conventional container before the neck of the oil container is inserted into the oil filler neck of the engine block.

The pouring device in accordance with an embodiment of the present invention will selectively allow the oil contained in the container to flow out of the discharged aperture into the oil filler neck of the engine block once the pouring device reaches a predetermined relationship with the exterior surface of the engine block.

The pouring device in accordance with the present invention will conform to conventional forms of manufacturing, be of simple construction and easy to use has to provide a pouring device which will be economically feasible, long lasting and relatively trouble free in operation.

The pouring device in accordance with an embodiment of the present invention thus prevents the spilling of lubricating oil onto the exterior surface of an engine block when the lubricating oil is transferred from a conventional oil container to the oil filler neck of an engine.

According to one embodiment of the present invention, ther is provided a pouring device for pouring lubricating oil out of a conventional oil container and into an oil filler neck part of an engine, said oil container having an oil container discharge aperture, said pouring device comprising: a releasable securing for releasably securing said device over said oil container discharge aperture, a pouring spout, said pouring spout extending integrally from said releasable securing means, said pouring spout having a spout inlet aperture, a sealing membrane, said sealing membrane being hingely connected to said releasable securing means, adjacent said spout inlet aperture, said sealing membrane being pivotable between a closed position wherein said sealing membrane prevents said lubricating oil from flowing through said spout inlet aperture and an open position wherein said sealing membrane allows said lubrificating oil to flow through said spout inlet aperture, a releasable locking means for releasably locking said sealing membrane in said closed position, an actuating means for selectively releasing the locking action of said locking means on said sealing membrane upon said actuating means being pushed against said engine.

Preferably, said oil container has a container screw-thread positioned adjacent said discharge aperture and wherein said releasable securing means is a substantially cylindrical connecting neck, said connecting neck having a connecting neck screw-thread, whereby said connecting neck screw-thread is adapted to engage said container thread and cooperate with said container thread for releasably securing said pouring device over said container discharge aperture.

Conveniently, said connecting neck has an inner surface and wherein said pouring device further comprises an abutting seat extending integrally from said connecting neck, said abutting seat projecting substantially perpendicularly from said inner surface of said connecting neck, said abutting seat peripherally delimiting said spout inlet aperture, said abutting seat having an abutting seat peripheral surface, said sealing membrane being adapted to sealingly abut against said abutting seat peripheral surface when said sealing membrane is in said closed position.

Preferably, said releasable locking means is a locking lip extending integrally from a fraction of said abutting seat peripheral surface, said locking lip being adapted to override a fraction of said sealing membrane when said sealing membrane is in said closed position for preventing said sealing membrane from pivoting into said open position.

Conveniently, said actuating means comprises a biasing means attached to said sealing membrane for creating an initial biasing force which biases said sealing membrane against said locking lip and a trigger means attached to said biasing means for selectively increasing the value of said initial biasing force to a level at which it will allow said sealing membrane to overcome the locking action of said locking lip on said sealing membrane and cause said sealing membrane to pivot said open position.

Preferably, said pouring device further comprises an hinge means for hingely connecting said sealing membrane to said releasable securing means, an anchoring means for releasably anchoring said biasing means in a biased configuration, and wherein said biasing means is a substantially "L"-shaped strip of relatively resilient material, said strip having a strip spacing segment fixed to said sealing membrane adjacent its periphery and opposite said hinge means, said strip spacing segment extending substantially perpendicularly away from said sealing membrane and a strip transversal segment extending across said sealing membrane in an overriding relationship with the latter, said strip transversal segment having a distal free end, said distal free end being adapted to be releasably attached to said anchoring means when said biasing means is in said biased configuration.

BRIEF DESCRIPTION OF THE DRAWINGS

An embodiment of the present invention will now be described, by way of example, in reference to the following drawings in which:

FIG. 2: in a perspective view, illustrates a pouring device in accordance with an embodiment of the present invention with sections taken out in order to show some of the components of the pouring device.

FIG. 3: in a detailed perspective view taken inside arrows 3—3 of FIG. 2, illustrates the relationship between a locking lip part of the invention and a sealing membrane also part of the invention.

DETAILED DESCRIPTION

Figure 1:
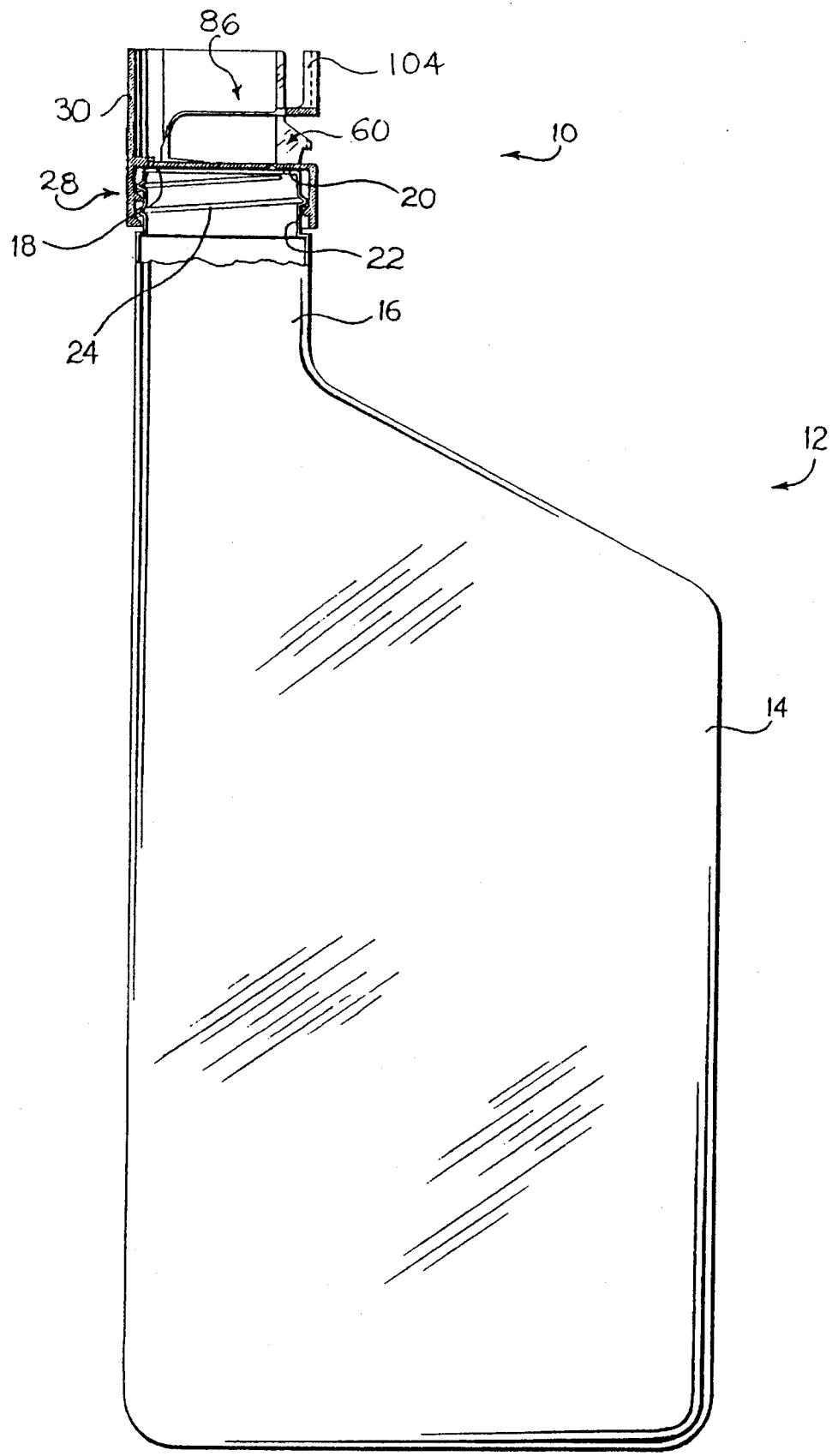
FIG. 1: in an elevational view, illustrates a pouring device in accordance with an embodiment of the present invention secured over the discharged aperture of a conventional lubricating oil container, the pouring device is shown in longitudinal cross-section to illustrate the relationship between the pouring device and the discharge aperture of the conventional oil container.

Referring to FIG. 1, there is shown a pouring device 10 in accordance with an embodiment of the present invention. The pouring device 10 is threadaly mounted on a conventional lubricating oil container 12. The container 12 has a substantially parallelepiped-shaped main containing body 14. The main containing body 14 extends integrally into a pouring neck 16. The pouring neck 16 has a discharge aperture 18. The discharge aperture 18 has a peripheral rim 20. The pouring neck 16 also has a connecting segment 22. The connecting segment 22 is positioned adjacent the discharge aperture 18. The outer surface of the connecting segment 22 has an integrally projecting connecting segment screw-thread 24.

The connecting segment 22 is adapted to threadaly receive and releasably retain a conventional oil container cap (not shown). The conventional oil container cap has a cap disk-shaped wall and an integrally and perpendicularly depending peripheral connecting skirt. The inner surface of the connecting skirt of the conventional oil container cap has an integrally projecting connecting skirt screw-thread. The skirt screw-thread of the cap is adapted to engage the connecting segment screw-thread 24 and cooperate with the latter for releasably securing the cap over the discharge aperture 18.

A disk-shaped foil (not shown) made of relatively thin metallic or polymeric material is sealingly mounted over the discharge aperture 18 of an unused container 12 under the removable cap. The disk-shaped foil is adapted to seal-in the oil inside the container 12 and prevent the oil from leaking out of the cap during shipping and handling of the container 12 prior to its first use. The peripheral edge of the disk-shaped foil is glued to the peripheral rim 20 of the discharge aperture 18. The foil is adapted to be peeled-off from the discharge aperture 18 before the initial pouring of the oil out of the container 12.

The pouring device 10 has a generally cylindrical shape. The pouring device 10 has a connecting neck portion 28. The connecting neck portion 28 has a substantially cylindrical neck wall 30. The substantially cylindrical neck wall 30 has a longitudinal axis indicated in FIG. 5 by the reference letter A. The neck wall 30 has an outer surface 32 and an inner surface 34. The inner surface 34 of the neck wall 30 has an integrally projecting neck screw-thread 36. The neck screw-thread 36 of the device 10 is adapted to engage the connecting segment screw-thread 24 of the container 12 and cooperate with the latter for releasably securing the pouring device 10 to the connecting segment 22 of the container 12. The neck wall 30 extends integrally into an abutting seat 38. The abutting seat 38 projects inwardly and substantially perpendicularly from the inner surface 34 of the neck wall 30. The abutting seat 38 is adapted to abut against the peripheral rim 20 of the discharge aperture 18 of the container 12 when the pouring device 10 is screwed onto the connecting segment 22 of the container 12. The abutting seat 38 has an abutting seat arcuate segment 40 and an abutting seat platform segment 42. The abutting seat arcuate segment 40 has substantially the shape of a truncated ring. The abutting seat arcuate segment 40 extends circumferentially from the inner surface 34 of the neck wall 30 over a partial circumference covering approximately 260 degrees. The abutting seat arcuate segment 40 has an outer peripheral edge which merges into the inner surface 34 of the neck wall 30 and an arcuate inner peripheral edge 44. The platform segment 42 has substantially the shape of a fraction of a truncated disk. The platform segment 42 has an outer peripheral edge which merges into the inner surface 34 of the neck wall 30 and a substantially rectilinear inner peripheral edge 46. The rectilinear inner peripheral edge 46 intercepts the abutting seat arcuate segment 40. As illustrated more specifically in FIGS. 4 through 6, the rectilinear inner peripheral edge 46 has a substantially bevelled cross-sectional configuration.

A pouring spout 48 extends integrally from the outer peripheral edge of the abutting seat arcuate segment 40. The pouring spout 48 has a longitudinally truncated, substantially cylindrical, arcuate spout wall 50. The arcuate spout wall 50 has an arcuate, generally "C"-shaped cross-sectional configuration. The arcuate spout wall 50 has an inner surface 52 and an outer surface 54. The outer surface of the arcuate spout wall 50 is in register with the outer surface 32 of the neck wall 30. The outer surface 54 of the arcuate spout wall 50 and the outer surface 32 of the neck wall 30 thus form a substantially continuous arcuate surface. Each end segment of the arc formed by the arcuate spout wall 50 extends integrally into a rectilinear spout wall segment 56. The rectilinear spout wall segments 56 extend inwardly towards each other in a direction parallel to the rectilinear inner peripheral edge 46 of the abutting seat 38. In fact, the rectilinear spout wall segments 56 extend integrally from a portion of the rectilinear inner peripheral edge 46, on each side of the latter. The rectilinear spout wall segments 56 stop short of merging into each other. A spacing 58 extends between the rectilinear spout wall segments 56.

A pair of relatively thin locking blocks 60 extend integrally from a fraction of the rectilinear spout wall segments 56 and a fraction of the abutting seat platform segment 42. The locking blocks 60 extend generally perpendicularly to the rectilinear spout wall segments 56 and away from the rectilinear inner peripheral edge 46. Each locking block 60 defines a set of exposed surfaces. Each locking block 60 has a first inclined locking block surface 62 which extends from the abutting seat platform segment 42 in an inclined direction simultaneously away from the abutting seat platform segment 42 and away from the rectilinear spout wall segments 56. The first inclined locking block surface 62 extends in a direction forming an angle, indicated in FIG. 4 by the reference letter B, relatively to the abutting seat platform segment 42. The first inclined locking block surface 62 bends integrally into a locking block locking surface 64 which extends perpendicularly away from the rectilinear spout wall segments 56. The locking block locking surface 64 bends integrally into a locking block spacing segment 66. The locking block spacing segment 66 extends in a plane substantially parallel to the rectilinear spout wall segments 56. The locking block spacing segment 66 bends integrally into a locking block guiding segment 68. The locking block guiding segment 68 extends in a direction which is oriented simultaneously towards the rectilinear spout wall segments 56 and away from the abutting seat platform segment 42. The locking block guiding segment 68 merges into the rectilinear spout wall segments 56 at a distance from the abutting seat platform segment 42 which corresponds approximately to one third of the length of the rectilinear spout wall segments 56.

Figure 4:
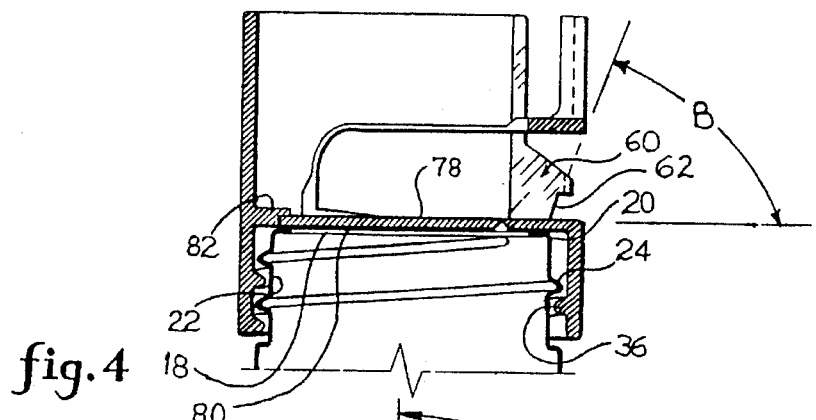
FIG. 4: in a longitudinal cross sectional view illustrates a pouring device in accordance with an embodiment of the present invention threadaly mounted over the discharged aperture of a conventional lubricating oil container with its sealing membrane in a closed position and its actuating mechanism in an unbiased configuration.
Figure 5:
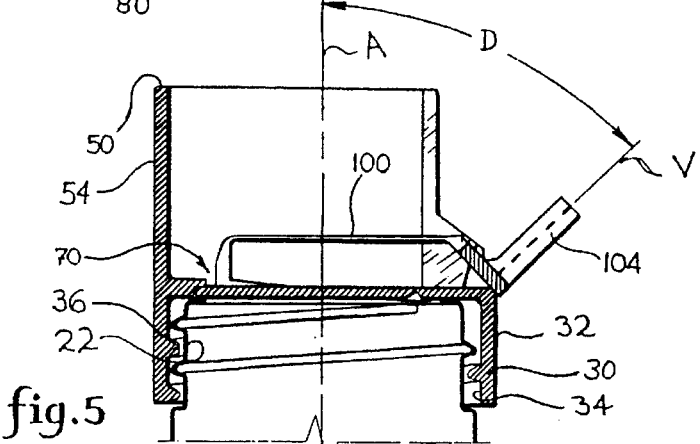
FIG. 5: in a longitudinal cross sectional view illustrates a pouring device in accordance with an embodiment of the present invention threadaly mounted over a discharged aperture of a conventional lubricating oil container with its sealing membrane in a closed position and its trigger mechanism in a biased configuration.
Figure 6:
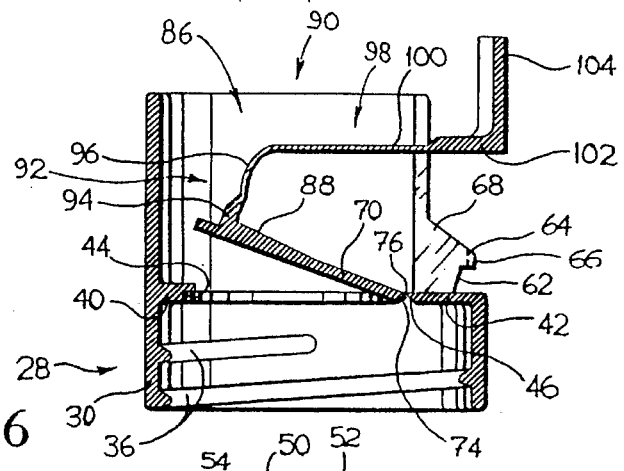
FIG. 6: in a longitudinal cross sectional view illustrates a pouring device in accordance with an embodiment of the present invention with its sealing membrane in a partially opened configuration and its actuating mechanism in an unbiased configuration.
Figure 7:
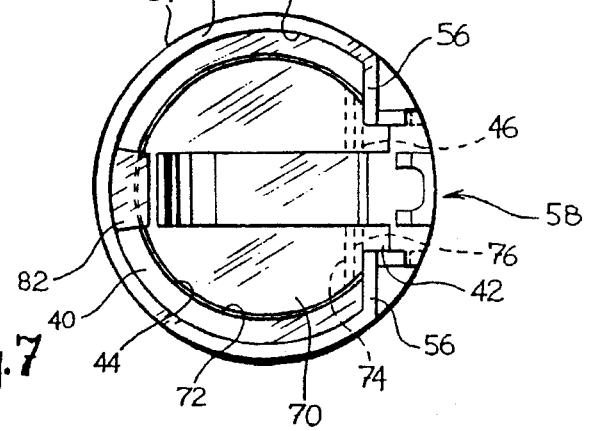
FIG. 7: in a top view illustrates a pouring device in accordance with an embodiment of the present invention with its sealing membrane in a closed position and its trigger mechanism in an unbiased configuration.

A sealing membrane 70 is hingely connected to the substantially rectilinear inner peripheral edge 46 of the platform segment 42 of the abutting seat 38. The sealing membrane 70 has a peripheral edge divided into a sealing membrane peripheral arcuate segment 72 and a sealing membrane peripheral rectilinear segment 74. The sealing membrane 70 thus has substantially the shape of a truncated disk. As illustrated in FIGS. 4 through 6, the sealing membrane peripheral rectilinear segment 74 has a substantially bevelled cross-sectional configuration. The substantially bevelled sealing membrane peripheral rectilinear segment 74 and the substantially bevelled rectilinear inner peripheral edge 46 of the platform segment 42 of the abutting seat 38 are hingely joined by a relatively thin hinge strip 76. The hinge strip 76 extends integrally from the adjacent edges of both the rectilinear segment 74 and the inner peripheral edge 46. The hinge strip 76 is thus adapted to allow the pivotal action of the sealing membrane 70 in the direction indicated by arrow P in FIG. 9 and to prevent the pivotal action of the sealing membrane 70 in the opposite direction.

Figure 8:
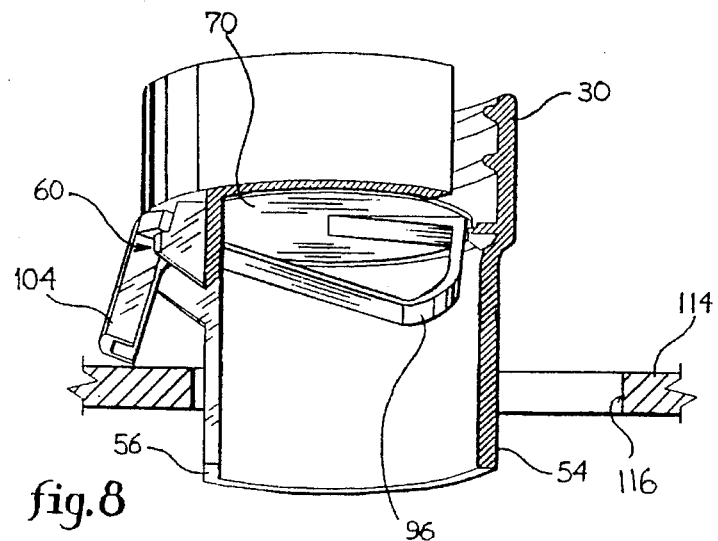
FIG. 8: in a perspective view with sections taken out, illustrates a pouring device in accordance with an embodiment of the present invention being inserted into the oil filler neck of an engine.
Figure 10:
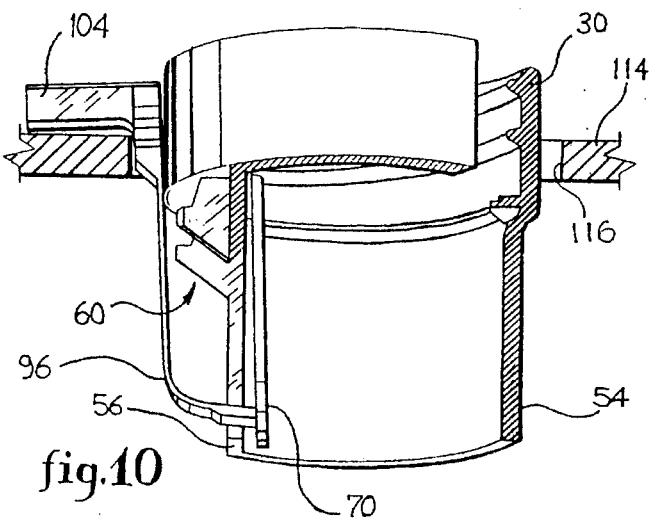
FIG. 10: in a perspective view with sections taken out, illustrates a pouring device in accordance with an embodiment of the present invention fully inserted into the oil filler neck of an engine.

The hinge strip 76 allows the sealing membrane 70 to pivot between a closed position illustrated in FIG. 8 and an open position illustrated in FIG. 10. In the closed position, the sealing membrane 70 is in register with the abutting seat 38 and the sealing membrane peripheral arcuate segment 72 sealingly abuts against the abutting seat arcuate segment 40. The sealing membrane 70 is thus adapted to prevent through passage of a fluid between the connecting neck portion 28 and the pouring spout 48. The sealing membrane 70 has a sealing membrane spout surface 78 which faces into the pouring spout 48 when the sealing membrane 70 is in its closed position. The sealing membrane 70 also has a sealing membrane connecting neck surface 80 which faces into the connecting neck portion 28 when the sealing membrane 70 is in its closed position.

In the open position, the sealing membrane 70 is pivoted away from the connecting neck portion 28 and lies in a plane substantially parallel to the rectilinear spout wall segments 56. In the open position, the sealing membrane 70 thus allows through passage of a fluid between the connecting neck portion 28 and the pouring spout 48.

A locking lip 82 extends integrally from a portion of the abutting seat arcuate segment 40 which is located opposite the abutting seat platform segment 42. The locking lip 82 has a locking lip locking surface 84 which is adapted to override and abut against a fraction of the sealing membrane spout surface 78 for preventing the sealing membrane 70 from pivoting to its open position.

An actuating component 86 is solidly attached to the sealing membrane spout surface 78. The actuating component 86 has an actuating component connecting strip 88 which protrudes integrally from the sealing membrane spout surface 78 opposite the sealing membrane peripheral rectilinear segment 74. The actuating component connecting strip 88 bends integrally into a substantially "L"-shaped biasing strip 90. The biasing strip 90 is adapted to be moved between an unbiased configuration illustrated in FIGS. 2 and 4 and a biased configuration illustrated in FIGS. 5, 6 and 9. The biasing strip 90 has a biasing strip spacing segment 92 which projects generally in a direction which is substantially perpendicular to the sealing membrane spout surface 78. The biasing strip spacing segment 92 is itself divided into a biasing strip spacing segment rectilinear portion 94 and a biasing strip spacing segment arcuate portion 96. The biasing strip spacing segment rectilinear portion 94 is relatively thicker than the biasing strip spacing segment arcuate portion 96. The biasing strip spacing segment arcuate portion 96 extends integrally into a biasing strip transversal segment 98. The biasing strip transversal segment 98, when the biasing strip 90 is in its unbiased configuration, extends in a plane which is substantially parallel to the sealing membrane 70. The biasing strip transversal segment 98 has a biasing strip transversal segment flexible portion 100 and an integrally extending biasing strip transversal segment rigid portion 102. The biasing strip transversal segment rigid portion 102 extends through the spacing 58 between the rectilinear spout wall segments 56. The biasing strip transversal segment flexible portion 100 is relatively thinner than the biasing strip transversal segment rigid portion 102. When the biasing strip 90 is in its unbiased configuration, the biasing strip transversal segment flexible portion 100 overrides the sealing membrane spout surface 78 and the biasing strip transversal segment rigid portion 102 overrides the seat platform segment 42.

The biasing strip transversal segment rigid portion 102 extends integrally into a trigger lever 104. The trigger lever 104 extends substantially perpendicularly from the biasing strip transversal segment rigid portion 102 in a direction away from the seat platform segment 42. The trigger lever 104 has a substantially "U"-shaped cross-sectional configuration. A pair of locking wings 106 project laterally from both sides of the biasing strip transversal segment rigid portion 102 adjacent its junction with the trigger lever 104. Each locking wing 106 has a locking wing first abutting surface 108 lying in a plane substantially parallel to the biasing strip transversal segment rigid portion 102 and a locking wing second abutting surface 110 lying in a plane substantially parallel to the trigger lever 104.

The specific design of the pouring device 10, in accordance with an embodiment of the present invention, allows it to be manufactured out of a single piece of injection moldable polymeric material.

In use, the pouring device 10 is adapted to be releasably fixed to the connecting segment 22 of a conventional oil container such as the oil container 12. In order to releasably secure the pouring device 10 to the connecting segment 22 of the oil container 10, a user must first remove the conventional oil container cap from the connecting segment 22 by unscrewing the conventional oil container cap. Before securing the pouring device 10 to the oil container 12, the user must also position the sealing membrane 70 in its closed position by inserting the portion of the sealing membrane spout surface 78 adjacent the locking lip 82 underneath the locking lip 82. Once the conventional oil container cap is removed from the oil container 12 and the sealing membrane 70 is in its closed position, the user then proceeds to releasably secure the pouring device 10 to the oil container 12.

The user screws the device 10 unto the connecting segment of the oil container by having the neck screw-thread 36 of the neck wall 30 engage the connecting segment screw-thread 24 of the container 12, as illustrated in FIGS. 4 and 5.

Figure 9:
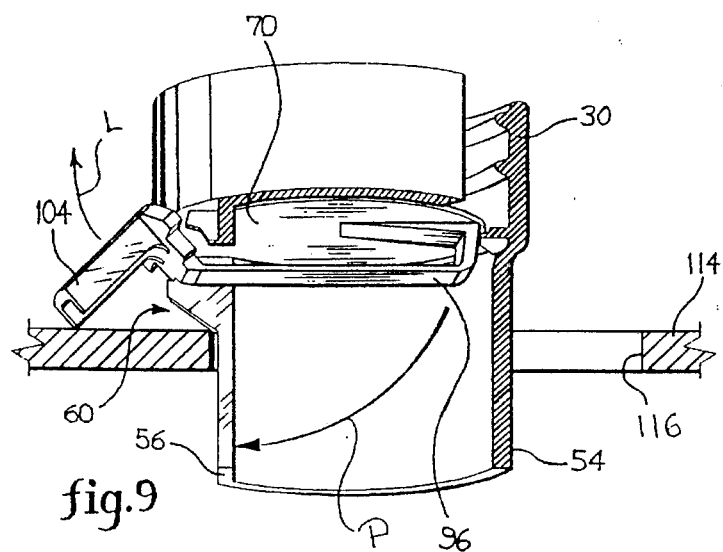
FIG. 9: in a perspective view with sections taken out, illustrates a pouring device in accordance with an embodiment of the present invention being pushed into the oil filler neck of a conventional engine.

Once the device 10 is properly secured to the connecting segment 22 of the oil container 12, the user brings the biasing strip 90 to its biased configuration. The biasing strip 90 is brought to its biased configuration by pulling on the trigger lever 104, clearing the locking block spacing segment 66 of the locking blocks 60 and anchoring the locking wings 106 in a locking abutting relationship with the locking blocks 60. The pulling action flattens the biasing strip spacing segment arcuate portion 96 which is thinner and thus more flexible then the biasing strip spacing segment rectilinear portion 94. The biasing strip 90 is made of a resilient material. The resilient material allows for the flattening of the biasing strip spacing segment arcuate portion 96 and creates a biasing force which has a tendency to force the biasing strip spacing segment arcuate portion 96 back towards its unbiased arcuate configuration. Consequently, the biasing strip spacing segment arcuate portion 96 pulls on the locking wings 106 which are releasably anchored to the locking blocks 60. When the locking wings 106 are releasably anchored to the locking blocks 60, the second abutting surfaces 110 are forced against the first inclined locking block surfaces 62. The locking wings 106 are releasably prevented from slipping off the first inclined locking block surfaces 62 by the locking block locking surface 64. In order for the second abutting surfaces 110 to abut flatly against the first inclined locking block surfaces 62, the biasing strip transversal segment 98 bends about the transition between the biasing strip transversal segment rigid portion 102 and the biasing strip transversal segment flexible portion 100, as illustrated in FIG. 9. When the locking wings 106 are releasably anchored to the locking blocks 60, the biasing strip transversal segment rigid portion 102 and the trigger lever 104 are tilted from their unbiased configuration and the longitudinal axis of the trigger lever, indicated by the reference letter V in FIG. 5 is angled relatively to the longitudinal axis A of the cylindrical neck wall 30. The angle between the longitudinal axis V of the trigger lever 104 and the longitudinal axis A of the cylindrical neck wall 30 is indicated by the reference letter D in FIG. 5, As stated previously, when the sealing membrane 70 is in its closed position, the sealing membrane peripheral arcuate segment 72 sealingly abuts against the abutting seat arcuate segment 40, thus sealingly preventing through passage of a fluid such as oil between the connecting neck portion 28 and the pouring spout 48. The oil container 12 with the pouring device 10 fined to its connecting segment 22 and the sealing membrane 70 locked in its closed position can thus be inverted so that its discharge aperture 18 faces downwardly without having oil pouring out of the oil container.

Once inverted, the oil container is lowered towards the engine into which oil is to be poured. The engine has an engine block wall 114 and an oil filler neck aperture 116 extending therethrough. The oil container 12 and its associated pouring device 10 is lowered until the pouring spout 48 penetrates into the oil filler neck aperture and the longitudinal peripheral edge of the trigger lever 104 abuts against the engine block wall 114, as illustrated in FIG. 8.

In order to release the locking action of the locking lip 82 on the sealing membrane 70, the user then exerts a downward pressure on the oil container which, in turn, forces the trigger lever 104 against the engine block wall 114. Since the longitudinal axis V of the trigger lever 104 is in an angled relationship relatively to the outer surface of the engine block wall 114, the pressure will cause the trigger lever 104 to pivot outwardly as indicated by the arrow L in FIG. 9. The pivoting of the trigger lever 104 will cause the biasing strip transversal segment rigid portion 102 to also pivot solidarly. The pivoting of the biasing strip transversal segment rigid portion 102 will further pull on the biasing strip spacing segment arcuate portion 96, causing the actuating component connecting strip 88 to further pull on the sealing membrane and eventually causing the sealing membrane 70 to clear the locking tongue 82, The pivoting of the trigger lever 104 will also cause the latter to slide-off the locking block 60, as illustrated in FIG. 9.

Once the sealing membrane 70 has cleared the locking tongue 82, the pressure exerted on the container and transmitted to the actuating lever 104 will cause the sealing membrane 70 to pivot to its open position. The sealing membrane being in its open position, the oil is free to flow from the container 12 into the oil filler neck aperture 116. The pressure exerted on the container and transmitted to the actuating lever 104 will also cause the spout 48 to penetrate deeper into the oil filler neck aperture 116 and the trigger lever 104 to lie flat against the engine block wall 114, as illustrated in FIG. 10.

The oil container 12 can thus be inverted and its content can be poured into the appropriate oil filler neck aperture without any oil dripping onto the engine block wall 114. Once the pouring operation is completed, the user merely pulls the spout 48 out of the oil filler aperture 116 and the pouring device can be unscrewed from the oil container 12 for an ulterior usage.

The embodiments of the invention in which an exclusive property or priviledge is claimed are defined as follows:

1. A pouring device for pouring lubricating oil out of a conventional oil container and into an oil filler neck part of an engine, said oil container having an oil container discharge aperture, said pouring device comprising:

a releasable securing means for releasably securing said device over said oil container discharge aperture, a pouring spout, said pouring spout extending integrally from said releasable securing means, said pouring spout having a spout inlet aperture, a sealing membrane, said sealing membrane being hingely connected to said releasable securing means, adjacent said spout inlet aperture, said sealing membrane being pivotable between a closed position wherein said sealing membrane prevents said lubricating oil from flowing through said spout inlet aperture and an open position wherein said sealing membrane allows said lubrificating oil to flow through said spout inlet aperture, a releasable locking means for releasably locking said sealing membrane in said closed position, an actuating means for selectively releasing the locking action of said locking means on said sealing membrane upon said actuating means being pushed against said engine.

2. A pouring device as recited in claim 1, wherein said oil container has a container screw-thread positioned adjacent said discharge aperture and wherein said releasable securing means is a substantially cylindrical connecting neck, said connecting neck having a connecting neck screw-thread, whereby said connecting neck screw-thread is adapted to engage said container thread and cooperate with said container thread for releasably securing said pouring device over said container discharge aperture.

3. A pouring device as recited in claim 2, wherein said connecting neck has an inner surface and wherein said pouring device further comprises an abutting seat extending integrally from said connecting neck, said abutting seat projecting substantially perpendicularly from said inner surface of said connecting neck, said abutting seat peripherally delimiting said spout inlet aperture, said abutting seat having an abutting seat peripheral surface, said sealing membrane being adapted to sealingly abut against said abutting seat peripheral surface when said sealing membrane is in said closed position.

4. A pouring device as recited in claim 3, wherein said releasable locking means is a locking lip extending integrally from a fraction of said abutting seat peripheral surface, said locking lip being adapted to override a fraction of said sealing membrane when said sealing membrane is in said closed position for preventing said sealing membrane from pivoting into said open position.

5. A pouring device as recited in claim 4 wherein said actuating means comprises a biasing means attached to said sealing membrane for creating an initial biasing force which biases said sealing membrane against said locking lip and a trigger means attached to said biasing means for selectively increasing the value of said initial biasing force to a level at which it will allow said sealing membrane to overcome the locking action of said locking lip on said sealing membrane and cause said sealing membrane to pivot into said open position.

6. A pouring device as recited in claim 5, wherein said pouring device further comprises an hinge means for hingely connecting said sealing membrane to said releasable securing means, an anchoring means for releasably anchoring said biasing means in a biased configuration, and wherein said biasing means is a substantially "L"-shaped strip of relatively resilient material, said strip having a strip spacing segment fixed to said sealing membrane adjacent its periphery and opposite said hinge means, said strip spacing segment extending substantially perpendicularly away from said sealing membrane and a strip transversal segment extending across said sealing membrane in an overriding relationship with the latter, said strip transversal segment having a distal free end, said distal free end being adapted to be releasably attached to said anchoring means when said biasing means is in said biased configuration.

\* \* \* \* \*